US006195979B1

(12) United States Patent
Fukuyama

(10) Patent No.: US 6,195,979 B1
(45) Date of Patent: Mar. 6, 2001

(54) COOLING APPARATUS FOR GAS TURBINE MOVING BLADE AND GAS TURBINE EQUIPPED WITH SAME

(75) Inventor: Yoshitaka Fukuyama, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/487,490

(22) Filed: Jan. 19, 2000

Related U.S. Application Data

(62) Division of application No. 08/937,516, filed on Sep. 25, 1997, now Pat. No. 6,094,905.

(30) Foreign Application Priority Data

Sep. 25, 1996 (JP) ................................................ P.8-253274

(51) Int. Cl.[7] ................................ F02C 7/16; F01D 9/02

(52) U.S. Cl. ........................... 60/39.75; 415/115; 416/95; 416/96 R

(58) Field of Search ........................... 60/39.75; 415/115; 416/95, 96 R

(56) References Cited

U.S. PATENT DOCUMENTS

| | | | | |
|---|---|---|---|---|
| 2,868,500 | * | 1/1959 | Boulet | 60/39.75 |
| 2,883,151 | * | 4/1959 | Dolida | 416/96 R |
| 2,977,090 | * | 3/1961 | McCarty et al. | 416/96 |
| 3,443,790 | * | 5/1969 | Buckland | 415/115 |
| 4,034,558 | * | 7/1977 | Korta et al. | 60/39.161 |
| 4,424,668 | * | 1/1984 | Mekherjee | 60/39.182 |
| 4,571,935 | * | 2/1986 | Rice | 60/39.182 |
| 5,054,996 | * | 10/1991 | Carreno | 415/115 |
| 5,279,111 | * | 1/1994 | Bell et al. | 60/39.75 |
| 5,340,274 | * | 8/1994 | Cunha | 415/115 |
| 5,399,065 | * | 3/1995 | Kudo et al. | 415/115 |
| 5,695,319 | * | 12/1997 | Matsumoto et al. | 60/39.75 |
| 5,755,556 | * | 5/1998 | Hultgren et al. | 60/39.75 |
| 5,758,487 | * | 6/1998 | Salt et al. | 60/39.75 |
| 5,795,130 | * | 8/1998 | Suenaga et al. | 416/96 R |

* cited by examiner

*Primary Examiner*—Ted Kim
(74) *Attorney, Agent, or Firm*—Oblon, Spivak, McClelland, Maier & Neustadt, P.C.

(57) ABSTRACT

A cooling apparatus is provided for a gas turbine moving blade and also to a gas turbine equipped with the cooling apparatus. The device is applicable to an electric power plant or the like, and more particularly, to a closed-loop cooling type cooling apparatus for a moving blade which achieves higher cooling efficiency by supplying in parallel a cooling medium from the inside of the turbine rotor to respective moving blades forming a plurality of stages and recovering the cooling medium which has been used for cooling so as to achieve higher energy efficiency.

4 Claims, 10 Drawing Sheets

COOLING APPARATUS FOR GAS TURBINE MOVING BLADE AND GAS TURBINE EQUIPPED WITH SAME

This application is a Division of application Ser. No. 08/937,516 filed on Sep. 25, 1997, now U.S. Pat. No. 6,094,905.

BACKGROUND OF THE INVENTION

1. Field of the Invention

The present invention relates to a cooling apparatus for a gas turbine moving blade and also to a gas turbine equipped with the cooling apparatus and applied to an electric power plant or the like and, more particularly, to a closed-loop cooling type cooling apparatus for a moving blade which achieves a higher cooling efficiency by supplying in parallel a cooling medium from the inside of a turbine rotor to respective moving blades constituting a plurality of stages and recovering the cooling medium, which has been used for cooling, so as to achieve higher energy efficiency.

2. Discussion of the Background

In recent years, it has become especially important to improve operating efficiency of a gas turbine used at an electric power plant or the like from the standpoint of economy, namely, a reduced amount of fuel supplied for combustion and of environmental preservation, namely, reduced emission of $CO_2$ and NOx.

Hitherto, a combined cycle power generating system composed of a hot gas turbine and a steam turbine has been considered as a power generating system with the highest efficiency. In the combined cycle power generating system, increasing the temperature at the inlet of the gas turbine is directly related to higher thermal efficiency of power generation. For this reason, technological development efforts have been made to fulfill goals including increasing the combustion gas temperature at the inlet of the gas turbine to 1500° C. or higher from the current temperature of 1300° C. which has already exceeded the melting point of metallic materials.

In such a high-temperature gas turbine, the sections exposed to high-temperature gas are generally cooled by circulating high-pressure air supplied from an air compressor. For cooling the moving blades, in particular, which are fixed to a turbine rotor and placed in the field of a strong centrifugal force, so-called "open-loop cooling" has been used wherein cooling air is introduced from a cooling air passage, which is formed at the center of the turbine rotor, into a plurality of stages of moving blades so as to convectively cool the inside of the moving blades, then the air which has been used for the cooling is let out into a mainstream combustion gas.

FIG. 13 illustrates an example of a conventional gas turbine cooling unit which employs the open-loop cooling technology described above. A turbine rotor 15 of the example shown in the drawing is constituted by connecting a plurality of discs 6, 7 and 8 which have, for example, first through third stages of implanted moving blades 3, 4 and 5 between a front disc 1*a* made integral with a front shaft 1 and a rear disc 2 separate from the front disc 1*a*. They are connected together with spacers 12 and 13 disposed in correspondence with the predetermined positions of stationary blades 9, 10 and 11 by using a plurality of tie-bolts 14 which are parallel to the central axis portion of the turbine rotor 15. On the side of the outer peripheries of the tie-bolts 14 in the turbine rotor 15, there are spaces 16, 17, 18, 19, 20 and 21 respectively defined between the front disc 1*a* and the disc 6 of the first-stage moving blade, between the respective discs 6, 7 and 8 and the spacers 12 and 13, and between the rear disc 2 and the third-stage disc 8. These spaces 16, 17, 18, 19, 20 and 21 are in communication with spaces 28, 29, 30 and 31 on the side of the inner peripheries thereof through grooves 22, 23, 24, 25, 26 and 27 at the connecting portion formed by the tie-bolts 14.

When the gas turbine, such as shown in FIG. 13, is operated, a part of combustion air supplied from an air compressor is used as a cooling medium, and the cooling air (arrow a) serving as the cooling medium is led from the interior of the front shaft 1 into the spaces 28, 29, 30 and 31 in sequence on the inner periphery side. The cooling air flows outward in the radial direction in the spaces 16, 17, 18, 19, 20 and 21 on the outer periphery side through the grooves 22, 23, 24, 25, 26 and 27 and then flows into an internal cooling passage (such as a meandering channel or the like which is not shown) of the moving blades, or into the gap between the disc 8 of the last stage (i.e. the third stage) and the spacer 13 clamping it and the rear disc 2. After the cooling air flows in the internal passage or the like to carry out convective cooling, it is jetted into a mainstream combustion gas (arrow b).

In the case of such an open-loop cooling type gas turbine, however, the low-temperature air a used for cooling is jetted into the high-temperature mainstream gas b to to be mixed therewith. This leads to a drop in the temperature of the mainstream gas b, an increase in the loss of the flow attributable to the mixing, and a loss in the pumping power relative to the cooling air a in the rotation field, etc., resulting in a drop in the turbine output due to cooling. The drop in the turbine output leads to lower power generating efficiency. Further, even if an air compressor of the same size is used, the increase in the cooling air a causes a decrease in the combustion air with a consequent drop in the power of the gas turbine.

If the temperature of the gas turbine is further increased in the future with the above-mentioned problems unsolved, it is likely that more air for cooling the blades will be necessary, and the cooling will markedly restrict improvement of the efficiency achieved by raising the temperature, or the combustion air to be used for a low-NOx combustor will be insufficient, preventing the increase of the gas temperature.

As a solution to such problems, there has been proposed an improvement in the air-cooled gas turbine, or a "closed-loop cooling type steam-cooled gas turbine" in which water vapor or the like is used as the cooling medium and recovered after being used for the cooling. For instance, Japanese Patent Laid-open Publication No. HEI 8-14064 discloses an art wherein air or vapor is employed as the cooling medium and the cooling medium is recovered after it is used for cooling, thereby preventing the thermal efficiency from decreasing. Japanese Patent Laid-open Publication No. HEI 7-301127 discloses an art wherein steam is used as the cooling medium in most cases, and the cooling medium after it has been used for cooling is recovered so as to improve the efficiency of the gas turbine.

In the closed-loop cooling type gas turbine cooling apparatus in the prior art described above, however, has a series cooling structure in which a plurality of cooling elements such as a plurality of stages are cooled in sequence. In this type of serial cooling structure, there is a likelihood that a high cooling effect is obtained only at a portion in contact with air on the upstream side, and the cooling effect deteriorates toward the downstream side. For example, there has been known a case where the trailing edges of blades, which are small portions of the blades, are insufficiently and unevenly cooled, resulting in cooling difficulties.

To solve the problem of the cooling difficulties, a cooling structure is conceivable wherein a plurality of stages are provided with a cooling medium arranged in parallel. In this case, however, successful layout of the members for controlling the flow of the cooling medium need to be achieved. For example, the turbine rotor runs at high speed, and the members provided in the turbine rotor to control the flow are subjected to an extremely strong centrifugal force. Therefore, the members controlling the flow must have adequately high structural strength. Specifically, discs or the like are used as in the conventional structure. However, high load would be applied to the circumferential portions of the discs. In addition, sliding motion or the like between the high-speed rotating section and a stationary section would be necessary, and therefore, special attention must be paid to the design of the sealing of the cooling medium.

Hitherto, there has been known no construction designed to perform parallel cooling by adopting the closed-loop cooling system and a gas turbine equipped with such cooling system, taking the foregoing respects into account. Furthermore, there has been no desirable art related especially to a multi-stage parallel cooling structure or to a combination of a steam cooling system and an air cooling system and a gas turbine equipped with such cooling system.

SUMMARY OF THE INVENTION

An object of the present invention is to substantially eliminate defects or drawbacks encountered in the prior art described above and to provide a cooling apparatus for a gas turbine moving blade having a parallel cooling system and a closed-loop cooling system under a preferable condition where a minimum of strength is required and easy design of sealing is permitted.

Another object of the present invention is to provide a cooling apparatus for a gas turbine moving blade capable of enabling efficient cooling by combining the parallel cooling system and the closed-loop cooling system with a simple means using air jet for cooling the trailing edges and other portions of the moving blades of the gas turbine where closed-loop convective cooling does not effectively work.

A further object of the present invention is to provide a gas turbine provided with the improved moving blade cooling apparatus having the characters mentioned above for achieving an improved power generation efficiency.

These and other objects can be achieved according to the present invention by providing, in one aspect a cooling apparatus for moving blade of a gas turbine having a rotor in which a plurality of discs are mounted with an interval between adjacent ones, a plurality of moving blades are each mounted to an outer peripheral portion of each of the discs and a plurality of spacers are disposed in the spaces between the respective discs at portions corresponding to portions of location of stationary blades and in which the moving blades are each formed with a cooling medium flowing passage having inlet and outlet portions communicated with an interior of the turbine rotor and the discs and the spacers are arranged with spaces therebetween for passing a cooling medium in a radial direction of the rotor, thereby constituting a closed-loop cooling unit for supplying the cooling medium to the cooling medium flowing passage formed in the moving blade and recovering the same therefrom, wherein a passage assembly, which is provided with a cooling medium supplying passage and a cooling medium recovering passage running in parallel to each other in an axial direction of the turbine rotor, is provided at a central axis portion of the turbine rotor, the cooling medium supplying passage of the passage assembly being formed with a cooling medium supplying port in communication with a side of a cooling medium inlet of the cooling medium flowing passage formed in the moving blade through the space, and the cooling medium recovering passage of the passage assembly being formed with a cooling medium recovering port in communication with a cooling medium outlet of the cooling medium flowing passage in the moving blade through the space.

In preferred embodiments of this aspect, the passage assembly is a columnar member mounted at the central axis portion of the turbine rotor, and the cooling medium supplying passage and the cooling medium recovering passage are formed of a plurality of bores provided at intervals around a circumferential direction of the columnar member. The passage assembly is further provided with another cooling medium supplying passage or another cooling medium recovering passage at the same central axis position. The bores forming the cooling medium supplying passage and the cooling medium recovering passage have radii having different distribution.

The passage assembly may be composed of a plurality of circular pipes disposed at intervals around the central axis of the turbine rotor, the circular pipes being fixed in the turbine rotor. The circular pipe is fixed to the turbine rotor through either one of the disc or spacer constituting the turbine rotor, or a positioning device provided in the turbine rotor. The passage assembly may be further provided with a circular pipe forming another cooling medium supplying passage or another cooling medium recovering passage at the sane central axis portion of the turbine rotor. The circular pipes forming the cooling medium supplying passage and the cooling medium recovering passage have radii having different distribution.

The cooling medium flows through the cooling medium supplying passage of the passage assembly under two or more different supplying conditions selected from type of cooling medium, temperature, humidity, pressure and velocity.

The moving blades are arranged in a direction from an upstream-stage to a downstream-stage and the cooling medium supplying ports are formed in a space defined on the upstream side of an upstream-stage moving blade and in a space defined on the downstream side of a downstream-stage moving blade, while the cooling medium recovering ports are formed in a space defined on the downstream side of the upstream-stage moving blade and in a space defined on the upstream side of the downstream-stage moving blade to thereby constitute a closed-loop cooling structure to cool the moving blades of the upstream- and downstream-stages in a parallel manner.

At least one of the discs or the spacers constituting the turbine rotor is extended to the central axis portion of the turbine rotor to compose a part of the passage assembly by using the extended portion and at least one of independent passage assemblies is connected to the extended part. The spacer comprising the turbine rotor is extended toward the central axis portion of the turbine rotor until it comes into contact with the passage assembly and a space between a pair of discs for constituting the turbine rotor which hold the spacer therebetween is divided into two sections in the axial direction.

A spacer located on the downstream side of the disc constituting the turbine rotor which is provided with an implanted moving blade of a high-temperature and high-pressure stage is formed to provide a disc shape which extends to the central axis portion of the turbine rotor and a space in the turbine rotor, in which the moving blade of the high-temperature and high-pressure stage is disposed, is separated from other stages by the spacer so as to supply the air discharged from a compressor to the moving blade of the high-temperature and high-pressure stage as a cooling medium to perform an open-loop cooling, while another cooling medium is supplied to the moving blades of other stages via the passage assembly to perform a closed-loop cooling.

In another aspect of the present invention, there is also provided a cooling apparatus for moving blade of a gas turbine having a rotor in which a plurality of discs are mounted with an interval between adjacent ones, a plurality of moving blades are mounted each to an outer peripheral portion of each of the discs and a plurality of spacers are disposed in the spaces between the respective discs at portions corresponding to portions of location of stationary blades and in which the moving blades are formed each with a cooling medium flowing passage having inlet and outlet portions communicated with an interior of the rotor, and the discs and the spacers are arranged with spaces therebetween for passing a cooling medium in a radial direction of the rotor, thereby constituting a closed-loop cooling unit for supplying the cooling medium to the cooling medium flowing passage formed in the moving blade and recovering the same therefrom, wherein sealing air is supplied from the inner peripheral ends of the stationary blades toward the outer peripheral surfaces of the discs, a passage assembly which has cooling medium supplying passages and cooling medium recovering passages running in parallel in the axial direction thereof is provided at the central axis portion of the turbine rotor, cooling medium supply ports in communication with the side of cooling medium inlets of the cooling medium flowing passage of the moving blades through the spaces are formed in the cooling medium supplying passages of the passage assembly, cooling medium recovering ports in communication with the side of the cooling medium outlets of the cooling medium flowing passages of the moving blades through the spaces are formed in the cooling medium recovering passages of the passage assembly and a sealing air recovering and cooling section which recovers a part of the sealing air for circulation so as to provide the cooling air to the trailing edge of a moving blade located on the upstream side of a stationary blade supplying the sealing air.

The present invention further provides a gas turbine which comprises a compressor for compressing air, a combustor operatively connected with the compressor to be supplied with the compressed air for carrying out combustion with a fuel, and a turbine body including a turbine rotor which is driven by a combustion gas from the combustor, and the turbine rotor is equipped with the cooling apparatus for the moving blade of the characters recited and defined above as preferred aspects of the present invention.

According to the characteristic features of the present invention described above, it is possible to cool the gas turbine moving blades of multiple stages in a parallel mode by the closed-loop cooling system under a preferable condition where a minimum of strength is required and easy design of sealing is permitted, thus greatly contributing to the improvement in a gas turbine and power generating efficiency. Moreover, the parallel cooling system and the closed-loop cooling are combined to apply the open-loop cooling based on air jet to the portions where it is difficult to obtain a sufficient cooling effect only through the closed-loop cooling, thus presenting such an advantage as the provision of a cooling technology for high-temperature gas turbines under an extensive range of conditions, which cooling art enabling efficient cooling by a simple means.

The nature and further characteristic features of the present invention will be made more clear from the following descriptions made with reference to the accompanying drawings.

DESCRIPTION OF THE PREFERRED EMBODIMENTS

The embodiments of a cooling apparatus for a gas turbine moving blade of the present invention will now be described with reference to FIG. 1 through FIG. 11 and also the embodiment of a gas turbine of the present invention equipped with such cooling apparatus will be described with reference to FIG. 12.

As is well known, a gas turbine system is generally composed of a compressor for compressing air, a combustor in which a compressed air and a fuel is mixed and burnt, and a turbine body generally comprising a turbine rotor which is operatively connected to the compressor and driven by the combustion gas from the combustor. According to the rotation of the turbine rotor, a generator is operated. The general arrangement of the gas turbine is shown in FIG. 12 which will be described hereinafter.

First Embodiment

Figure 1:
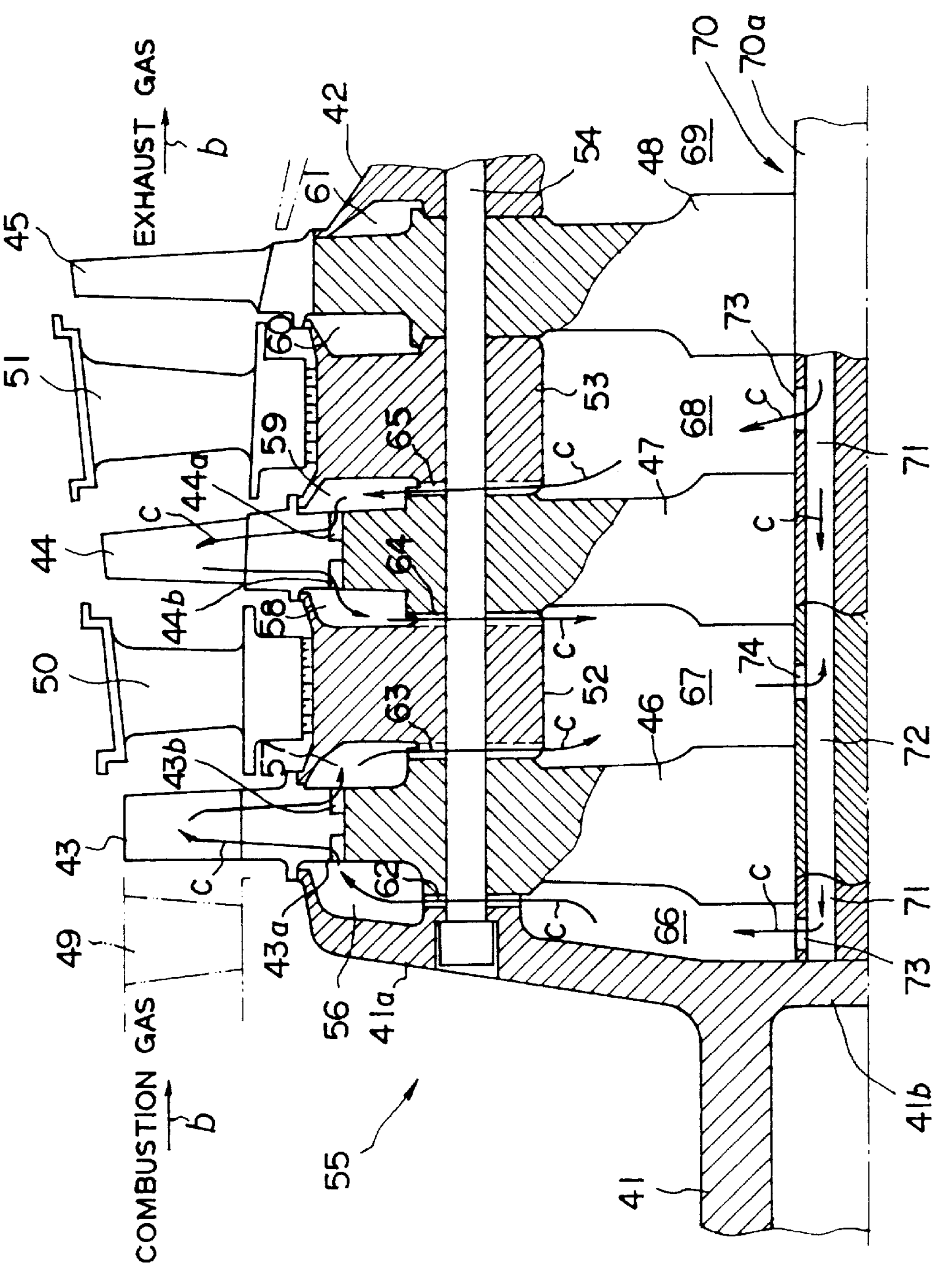
FIG. 1 is a sectional view illustrating a first embodiment of a gas turbine cooling apparatus in accordance with the present invention.
Figure 2:
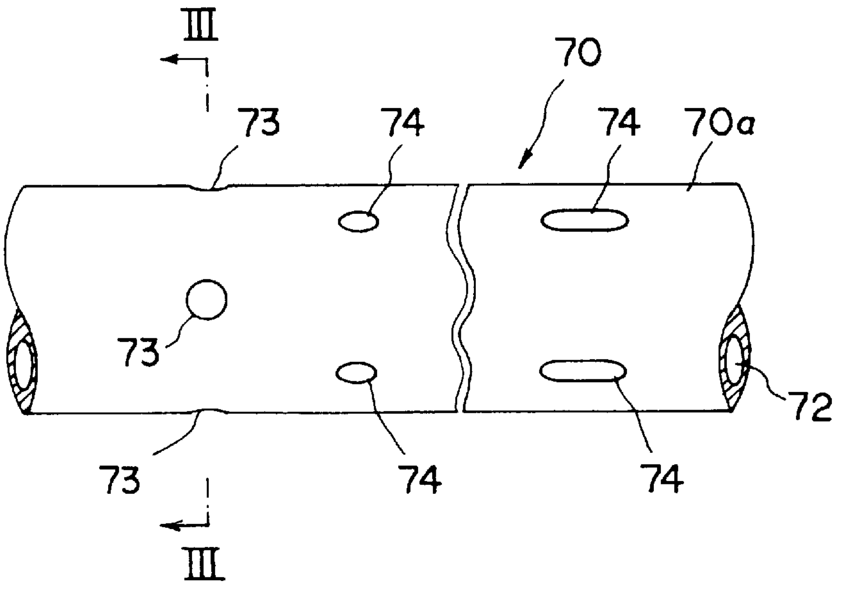
FIG. 2 is an enlarged sectional view showing a part of a passage assembly shown in FIG. 1.
Figure 3:
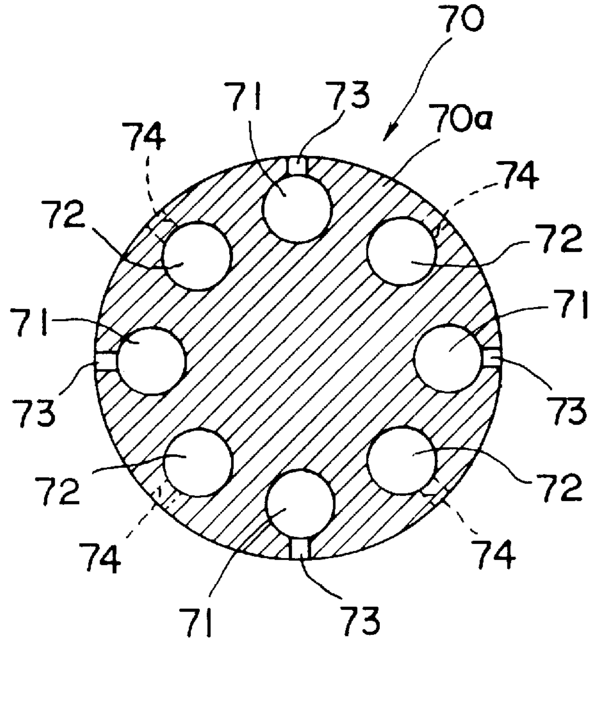
FIG. 3 is a sectional view taken along line III—III of FIG. 2.

A first embodiment of the cooling apparatus for a gas turbine moving blade is first described hereunder with reference to FIGS. 1 through 7, in which FIG. 1 is a general sectional view illustrative of a cooling apparatus for a gas turbine moving blade, FIG. 2 is an enlarged side view illustrative of a passage assembly shown in FIG. 1, FIG. 3 is a sectional view taken along line III—III of FIG. 2, and FIG. 4 through FIG. 7 are sectional views illustrative of the examples of the modifications of the passage assembly.

In FIG. 1, reference numeral 55 denotes a turbine rotor having a front shaft 41 mounted with a front disc 41*a*, and also having a rear disc 42 opposed thereto, a plurality of discs 46, 47, and 48 which have moving blades 43, 44, and 45 of, for example, first through third stages implanted in the outer peripheries thereof, and spacers 52 and 53 disposed in correspondence with the predetermined positions of stationary blades 49, 50 and 51. The turbine rotor 55 is generally composed of the front disc 41*a*, the discs 46, 47 and 48, the spacers 52 and 53, and the rear disc 42, which are linked by a plurality of tie-bolts 54 in parallel to the axial center thereof.

On the side of the outer peripheries of the tie-bolts 54 in the turbine rotor 55, spaces 56, 57, 58, 59, 60 and 61 are defined respectively between the front disc 41*a* and the disc 46 of the first-stage moving blade 43, between the respective discs 46, 47, and 48 and the spacers 52 and 53, and between the rear disc 42 and the third-stage disc 48. Among these spaces, the first four spaces, 56, 57, 58 and 59, are in communication with spaces 66, 67 and 68 on the side of the inner peripheries thereof via grooves 62, 63, 64, and 65 at the connecting portions formed by the tie-bolts 54. It should be noted that the spaces 60 and 61 on the side of the outer peripheries between the third-stage disc 48, the spacer 53 on the upstream side thereof, and the rear disc 42 are not communicated with the spaces 68 and 69 on the side of the inner peripheries.

Figure 12:
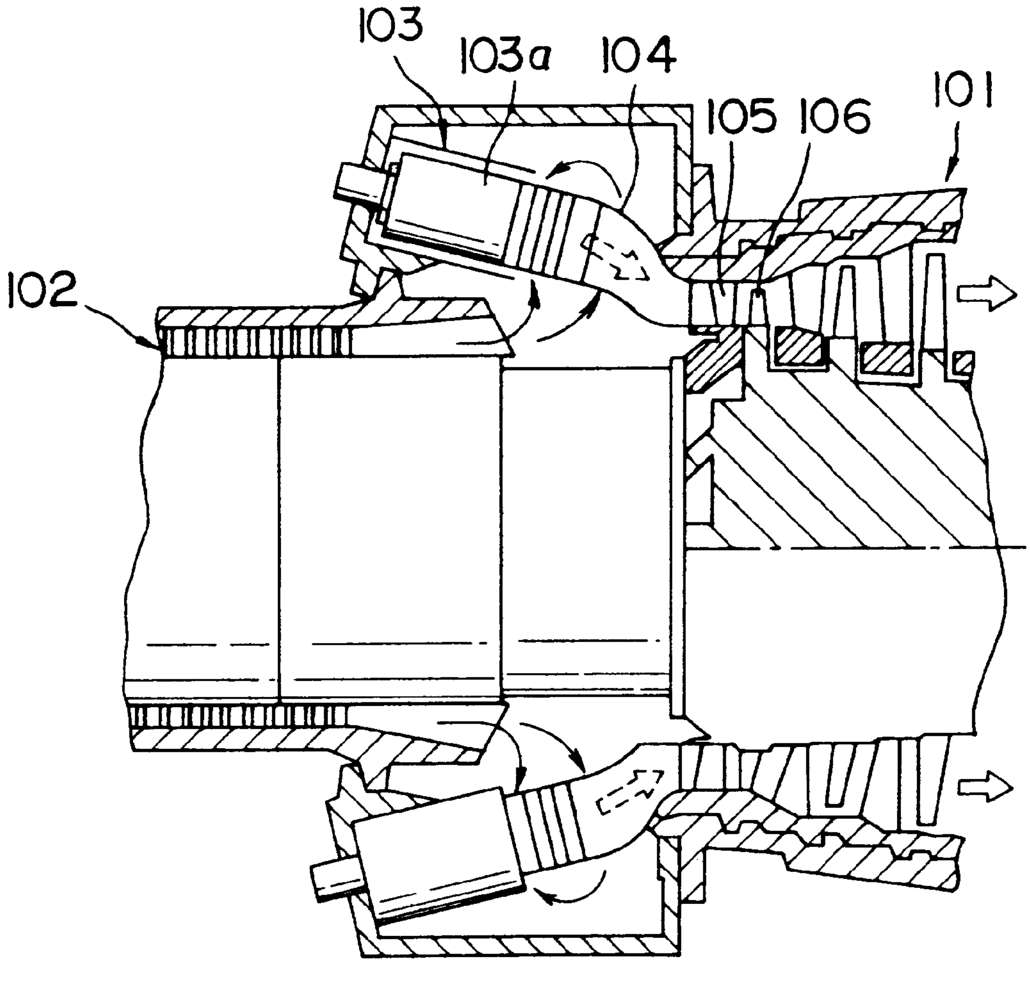
FIG. 12 is a sectional view illustrating another embodiment of the present invention representing a gas turbine to which the above embodiments of the moving blade cooling apparatus is applicable.
Figure 13:
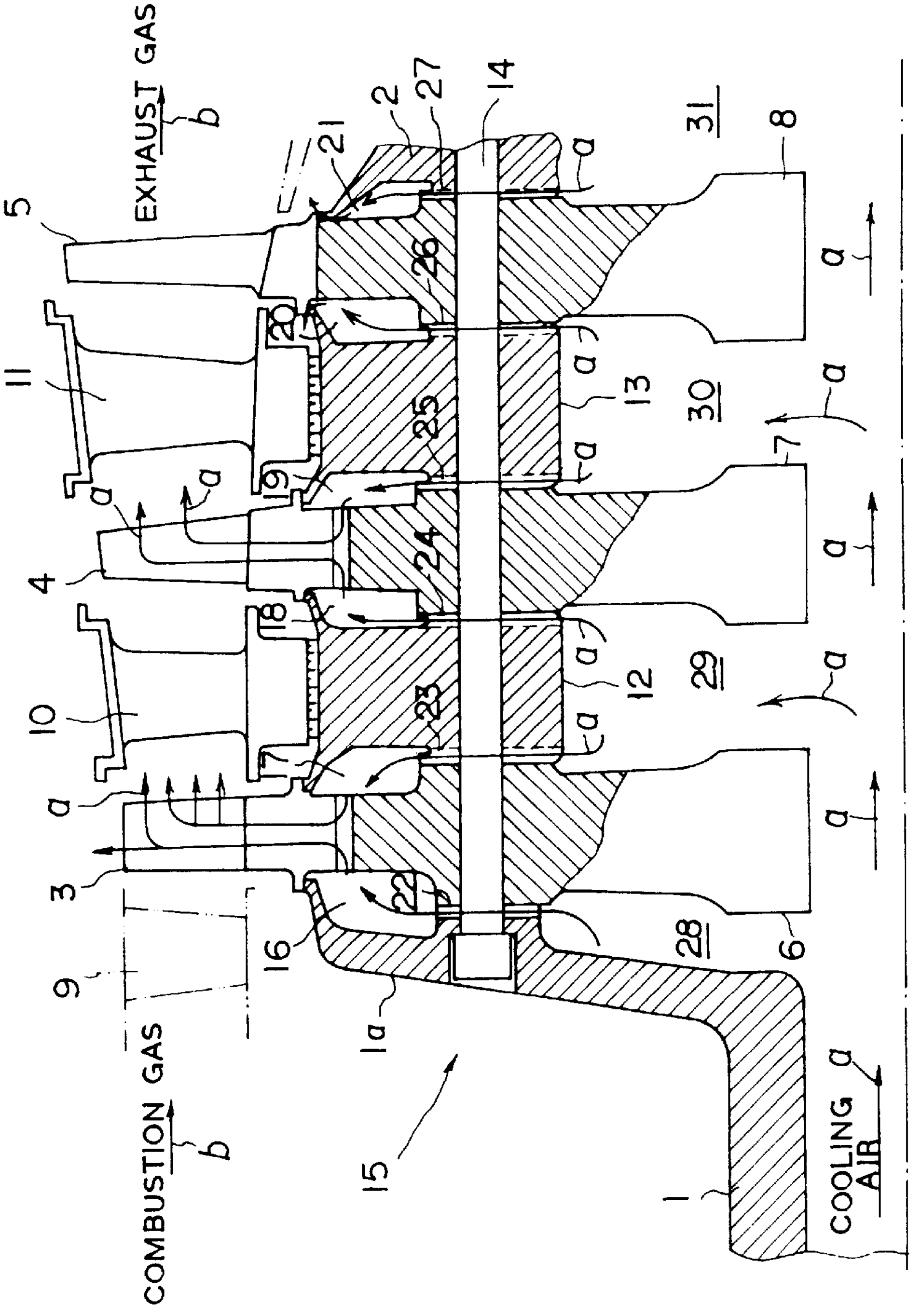
FIG. 13 PRIOR ART
FIG. 13 is a sectional view illustrating an example of a conventional gas turbine cooling apparatus.

The front shaft 41 is rotatably and integrally connected to a compressor, which is not shown in FIG. 1 but shown in FIG. 12. The front shaft 41 has a hollow structure and has a flange 41*b* at a portion thereof facing the spaces 66, 67 and 68 on the side of the inner peripheries, the flange 41*b* isolating the spaces 66, 67 and 68 on the side of the inner peripheries from the compressor.

In the present embodiment having the structure mentioned above, a passage assembly 70 through which a cooling medium such as steam used for closed-loop cooling flows is provided at the central axis portion of the turbine rotor 55 in the spaces 66, 67 and 68 on the side of the inner peripheries. The passage assembly 70 is composed of a columnar member 70*a* disposed on the central axis portion of the turbine rotor 55, the columnar member 70*a* is fixed and supported by the discs 46, 47 and 48 so that it rotates integrally with the turbine rotor 55.

As shown also in FIG. 2 and FIG. 3, formed in the columnar member 70*a* are cooling medium supplying passages 71 for supplying the cooling medium to the moving blades 43, 44 and 45, and cooling medium recovering passages 72 for recovering the cooling medium which is used for cooling, the passages 71 and 72 being arranged in parallel. More specifically, the cooling medium supplying passages 71 and the cooling medium recovering passages 72 are composed of a plurality of round bores formed at intervals around the axis in the columnar member 70*a*, and these cooling medium supplying passages 71 and the cooling medium recovering passages 72 are alternately disposed in the circumferential direction of the columnar member 70*a*. The cooling medium supplying passages 71 are, for example, connected to a cooling medium inlet, not shown, which is located on the right side as viewed in FIG. 1, through a seal section, while the cooling medium recovering passages 72 are similarly connected to a coolant outlet, also not shown, which is disposed on the right side as viewed in FIG. 1. An end of the columnar member 70*a*, namely, the left end thereof in FIG. 1, abuts against the flange 41*b* of the front shaft 41, thereby closing the distal ends of the cooling medium supplying passages 71 and the cooling medium recovering passages 72.

In the columnar member 70*a*, there are further formed cooling medium supplying ports 73 which allow some of the cooling medium supplying passages 71 to open to the side of the outer peripheries and cooling medium recovering ports 74 which allow some of the cooling medium recovering passages 72 to open to the side of the outer peripheries at positions different in the axial direction, respectively. For instance, as shown in FIG. 1, the cooling medium supplying ports 73 are opened to the two spaces 66 and 68 on the side of the inner peripheries which are away from each other in the axial direction of the turbine rotor 55. This causes the cooling medium supplying passages 71 to be in communication with the two spaces 66 and 68 on the side of the inner peripheries, so that the cooling medium supplied from the right side as viewed in FIG. 1 through the cooling medium supplying passages 71 is jetted into the two spaces 66 and 68 on the side of the inner peripheries. The cooling medium recovering ports 74 open to another space 67 on the side of the inner peripheries between the two spaces 66 and 68 on the side of the inner peripheries, and hence, the cooling medium which has been used for cooling flows from the space 67 on the side of the inner peripheries to the cooling medium recovering passages 72 through the cooling medium recovering ports 74 so that the cooling medium is recovered.

The first embodiment of the structure mentioned above will operate in the following manner.

From the cooling medium supplying ports 73, a cooling medium c, which has come from the right side as viewed in FIG. 1 through the cooling medium supplying passages 71, flows outward in the radial direction in the two spaces 66 and 68 on the side of the inner peripheries, passes through the grooves 62 and 65 at the tie-bolts 54, and then passes through the spaces 56 and 59 on the side of the outer peripheries in communication therewith before it flows into the internal passages through the cooling medium inlets 43*a* and 44*a* of the first-stage moving blade 43 and the second-stage moving blade 44 so as to convectively cool the insides of the respective moving blades 43 and 44. After being used for cooling, the cooling medium c is discharged through the cooling medium outlets 43*b* and 44*b* of the respective moving blades 43 and 44 into the spaces 57 and 58 on the side of the outer peripheries, which spaces are located between the first- and second-stage discs 46, 47, and the spacer 52 located therebetween, and the cooling medium flows through the grooves 63 and 64 at the tie-bolts 54 inward this time in the radial direction before entering the space 67 on the side of the inner peripheries which is located at the middle position. Then, the cooling medium eventually flows into the cooling medium recovering passages 72 through the cooling medium recovering ports 74. The cooling medium c flows to the right side as viewed in FIG. 1 to be let out of the gas turbine.

According to the first embodiment described above, the cooling medium c is supplied separately to the plurality of cooling elements, namely, the first-stage moving blade 43 and the second-stage moving blade 44 to perform parallel cooling. Hence, the cooling effect for the respective moving blades located on the upstream side and the downstream side with respect to a combustion gas is improved over that in the prior art, and for instance, the trailing edge portions which are the small portions of the moving blades can be also cooled sufficiently and uniformly.

Further, in this embodiment, the passage assembly 70 provided at the central axis portion of the turbine rotor 55 causes a minimum of centrifugal force to act regardless of the high-speed rotation of the turbine rotor 55, thereby making it possible to prevent a high load from occuring and accordingly to obviate the need for high structural strength. In addition, providing the passage assembly 70 at the central axis portion of the turbine rotor 55 also permits a compact structure and a relatively low rotational speed thereof since the passage assembly is located at the central axis portion, thus enabling the design of the seal of the cooling medium at the sliding portions required for the high-speed rotating sections and the stationary sections to be easily achieved.

Hence, the present embodiment makes it possible to achieve effective cooling of the moving blades of the gas turbine by combining the parallel cooling system and the closed-loop cooling system with preferable conditions that require a minimum of strength and permit easy design of the seal, thus greatly contributing to the increase of the temperature of the gas turbine.

In this embodiment described above, although a case where the first- and second-stages of the three-staged turbine are cooled has been shown, the third stage thereof may also be cooled in the same manner or the moving blades of multiple stages of more than three stages may also be cooled in the same manner.

Furthermore, as shown in FIG. 2 and FIG. 3, the passage assembly 70 of this embodiment is composed of the columnar member 70*a*, and a plurality of, e.g. a total of eight in the illustration, circular bores are formed therein in the circumferential direction thereof, the bores being divided into the cooling medium supplying passages 71 and the cooling medium recovering passages 72. However, the number of the bores may be set to any value. Further, in this embodiment, although the cooling medium supplying passages 71 and the cooling medium recovering passages 72 are shifted from each other in arrangement by, for example, 45° as shown in FIG. 3, the angle may be changed to any value.

The cooling medium supplying ports 73 and the cooling medium recovering ports 74 for communicating the cooling medium supplying passages 71 and the cooling medium recovering passages 72 to the spaces 66, 67 and 68 on the side of the inner peripheries of the turbine rotor 55 may have an arbitrary shape such as a circular shape or an elliptical shape as shown in FIG. 2, and the number and the opening spaces thereof may be set to arbitrary values.

Thus, the passage assembly 70 of the present embodiment may be implemented in a variety of modifications wherein the shapes, locations, quantities, sizes, etc. of the cooling medium supplying passages 71, the cooling medium recovering passages 72, the cooling medium supplying ports 73, the cooling medium recovering ports 74, etc. may be set arbitrarily.

Figure 4:
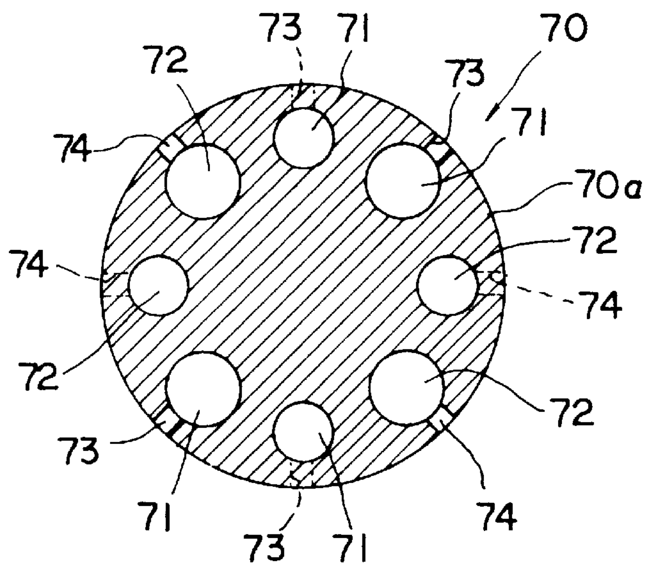
FIG. 4 is a sectional view illustrating a first modification of the passage assembly in the first embodiment.

FIG. 4 shows an example of a first modification of the passage assembly 70. In this example, the passage assembly 70 is composed of the columnar member 70*a*, and different circular bores are formed therein as the cooling medium supplying passages 71 and the cooling medium recovering passages 72. With this arrangement, the amount of the cooling medium to be supplied and recovered can be changed according to a portion to be cooled, permitting the cooling performance to be set differently depending on which section is to be cooled. In this case, the differences in diameter of the respective circular bores should be set in good balance so as to ensure stable rotation of the passage assembly 70.

Figure 5:
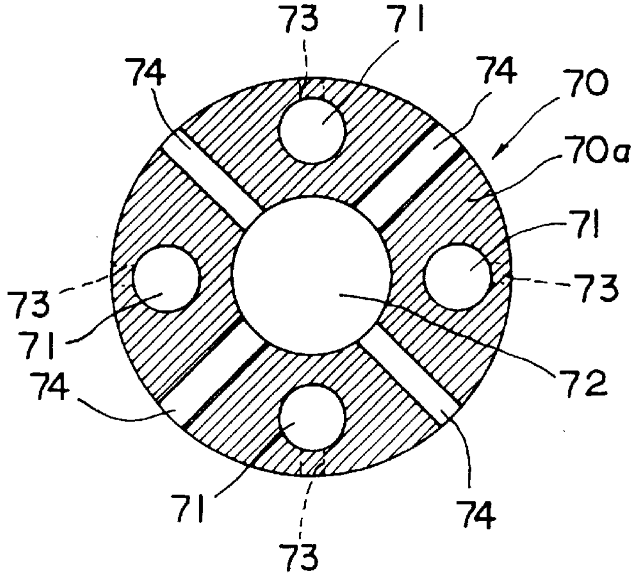
FIG. 5 is a sectional view illustrating a second modification of the passage assembly in the first embodiment.

FIG. 5 shows an example of a second modification of the passage assembly 70. In this example, the passage assembly is composed of the columnar member 70*a*. In addition to the cooling medium supplying passages 71 or the cooling medium recovering passages 72 provided around the axial center of the turbine rotor 55, another cooling medium supplying passage 71 or another cooling medium recovering passage 72 is provided at the central axis of the turbine rotor 55. For example, the circular bores at the outer peripheral section serve as the cooling medium supplying passages 71 and the single circular bore at the central portion serves as the cooling medium recovering passage 72. With this arrangement, since there is only one cooling medium recovering passage 72, the composition of the passages formed in the columnar member 70*a* is made simpler, and the radius of the cooling medium recovering passage 72 is made smaller than the radius of the cooling medium supplying passage 71 so as to permit greater effect for recovering the pumping power.

Figure 6:
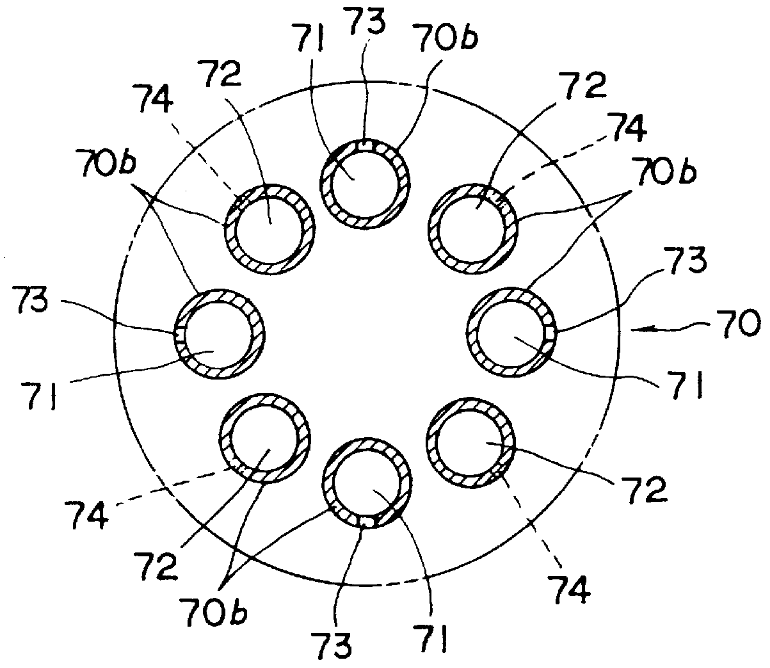
FIG. 6 is a sectional view illustrating a third modification of the passage assembly in the first embodiment.

FIG. 6 shows an example of a third modification of the passage assembly 70. In the examples of the first and second modifications, the passage assembly 70 is constituted by the columnar member provided with a plurality of circular bores, whereas the example illustrated in FIG. 6 is constructed by a set of a plurality of circular pipes. Specifically, circular pipes 70*b* constituting the passage assembly 70 are disposed at intervals around the central axis of the turbine rotor 55, and these circular pipes 70*b* are fixed in the turbine rotor 55 by the discs 46, 47, 48, and the spacers 52 and 53 for composing the turbine rotor 55, or by another positioning device, not shown, provided in the turbine rotor 55.

This arrangement of the third modification is advantageous in that the passage assembly 70 can be made lighter than any of the examples shown in FIG. 2 through FIG. 5 and that inexpensive circular pipes can be used for the constituent members. There is another advantage in that the passage assembly 70 is composed of a plurality of the circular pipes 70*b* disposed apart from each other, so that, if the temperatures of the cooling media circulating through the respective circular pipes 70*b* are different and then heat transfer does not take place. There is still another advantage in that a plurality of the cooling medium supplying ports 73 and the cooling medium recovering ports 74 can be formed in the circumferential direction of the respective circular pipes 70*b*, and optimum directions can be selected for the cooling medium supplying ports 73 and the cooling medium recovering ports 74, considering the flow of the cooling medium running between the discs 46, 47 and 48 for constituting the turbine rotor 55.

Figure 7:
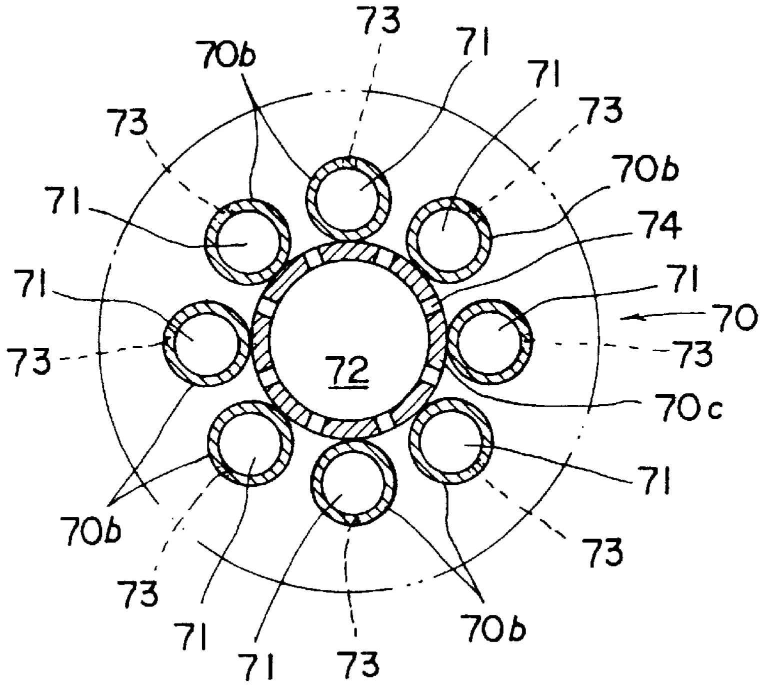
FIG. 7 is a sectional view illustrating a fourth modification of the passage assembly in the first embodiment.

FIG. 7 shows an example of a fourth modification of the passage assembly 70. This example is also constructed as a set of circular pipes as in the case of the example illustrated in FIG. 6. In addition to the circular pipe 70*b* disposed around the central axis portion of the turbine rotor 55, another circular pipe 70*c* which constitutes another cooling medium supplying passage 71 or another cooling medium recovering passage 72 is formed at the central axis portion. For instance, a plurality of the circular pipes 70*b* disposed around the central axis portion form the cooling medium supplying passages 71, and the single circular pipe 70*c* having a large diameter is formed at the central axis portion as the cooling medium recovering passage 72. This arrangement combines the advantages provided by the arrangement of the plurality of circular pipes shown in FIG. 6 and the advantages provided by the arrangement which has the single cooling medium recovering passage 72 shown in FIG. 5. Therefore, the modification is expected to be advantageous in that, for example, the cooling medium recovering passage 72 can be made shorter with a resultant reduced pressure loss.

In the stages of the gas turbine, the mainstream gas has distribution patterns of temperature, pressure, etc. from a high-pressure stage toward a low-pressure stage and there are cases where the cooling performance can be improved by changing the temperature or pressure of the cooling medium. Hence, it will be possible to obtain a setting so that the cooling medium circulates through the cooling medium supplying passages 71 of the passage assembly 70 shown in the foregoing embodiments under two or more supplying conditions in which the type, the temperature and the humidity, the pressure, the velocity, etc. are different.

Second Embodiment

Figure 8:
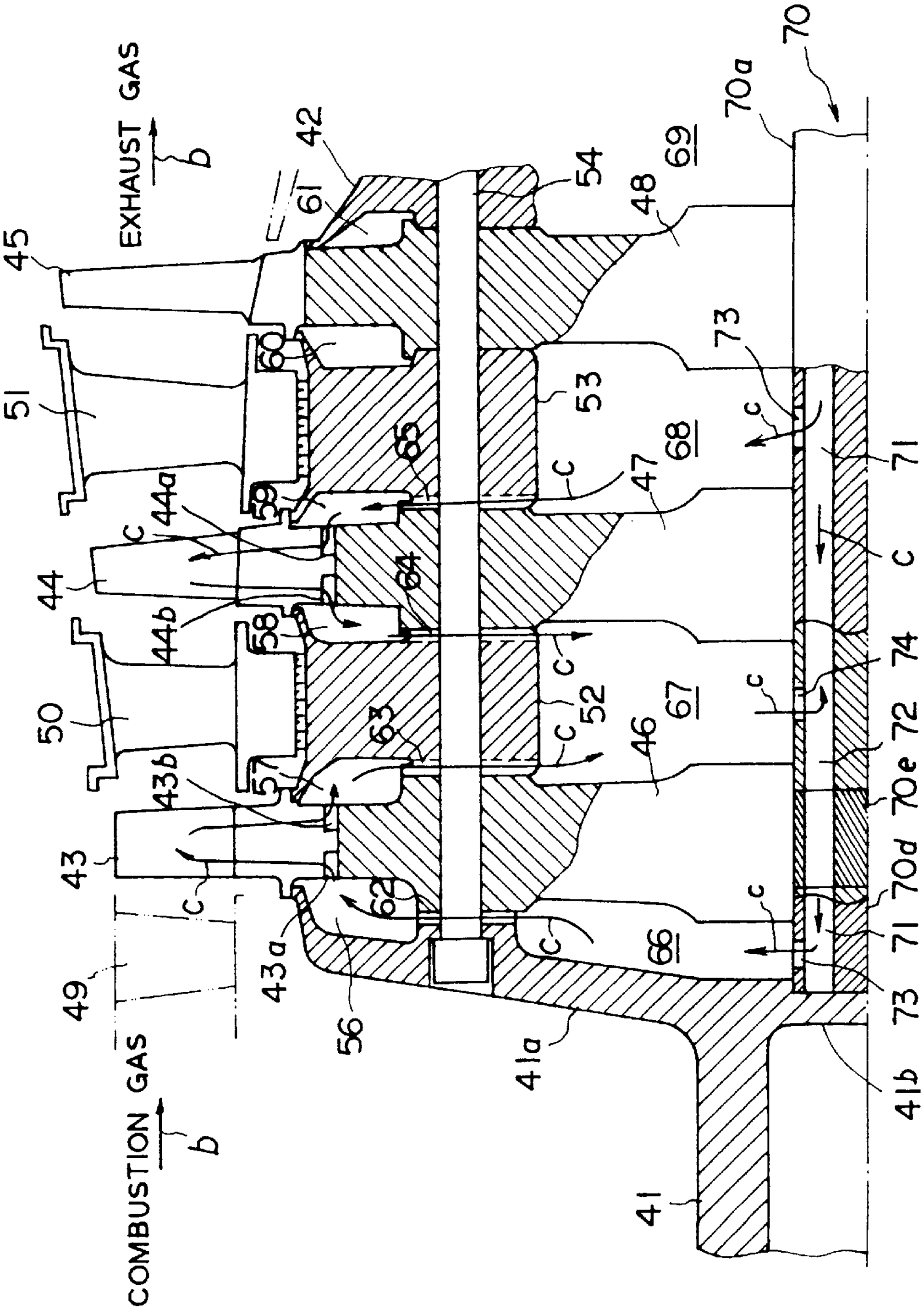
FIG. 8 is a sectional view illustrating a second embodiment of the gas turbine cooling apparatus in accordance with the present invention.

FIG. 8 is a sectional view illustrative of a second embodiment of a cooling apparatus for a gas turbine moving blade. This embodiment is different from the first embodiment in that at least one of the discs or the spacers for composing the turbine rotor is extended to the central axis portion of the turbine rotor, the extended portion constitutes a part of the passage assembly, and an independent single or a plurality of passage assemblies are connected to the extended portion.

Specifically, in this second embodiment, as shown in FIG. 8, the passage assembly 70 has a columnar member 70*a*, as a major section thereof, extending from the left side end, as viewed, of the passage assembly 70 to a portion thereof positioned downstream the first stage disc 46. A columnar member 70*d* made of a different component and a columnar section 70*e* formed at the central axis portion of the turbine rotor of the first-stage disc 46 are linked on the upstream side thereof so as to constitute the entire passage assembly 70. The divisional composition of the passage assembly 70 may be applied to the discs of the second stage and subsequent stage. The rest of the structure is approximately identical to the structure of the first embodiment, and therefore, like reference numerals shown in FIG. 1 are assigned to corresponding components in FIG. 8.

The structure of the second embodiment provides such advantage as reduced constituent components of the passage assembly 70 in addition to the similar advantages provided by the first embodiment.

Third Embodiment

Figure 9:
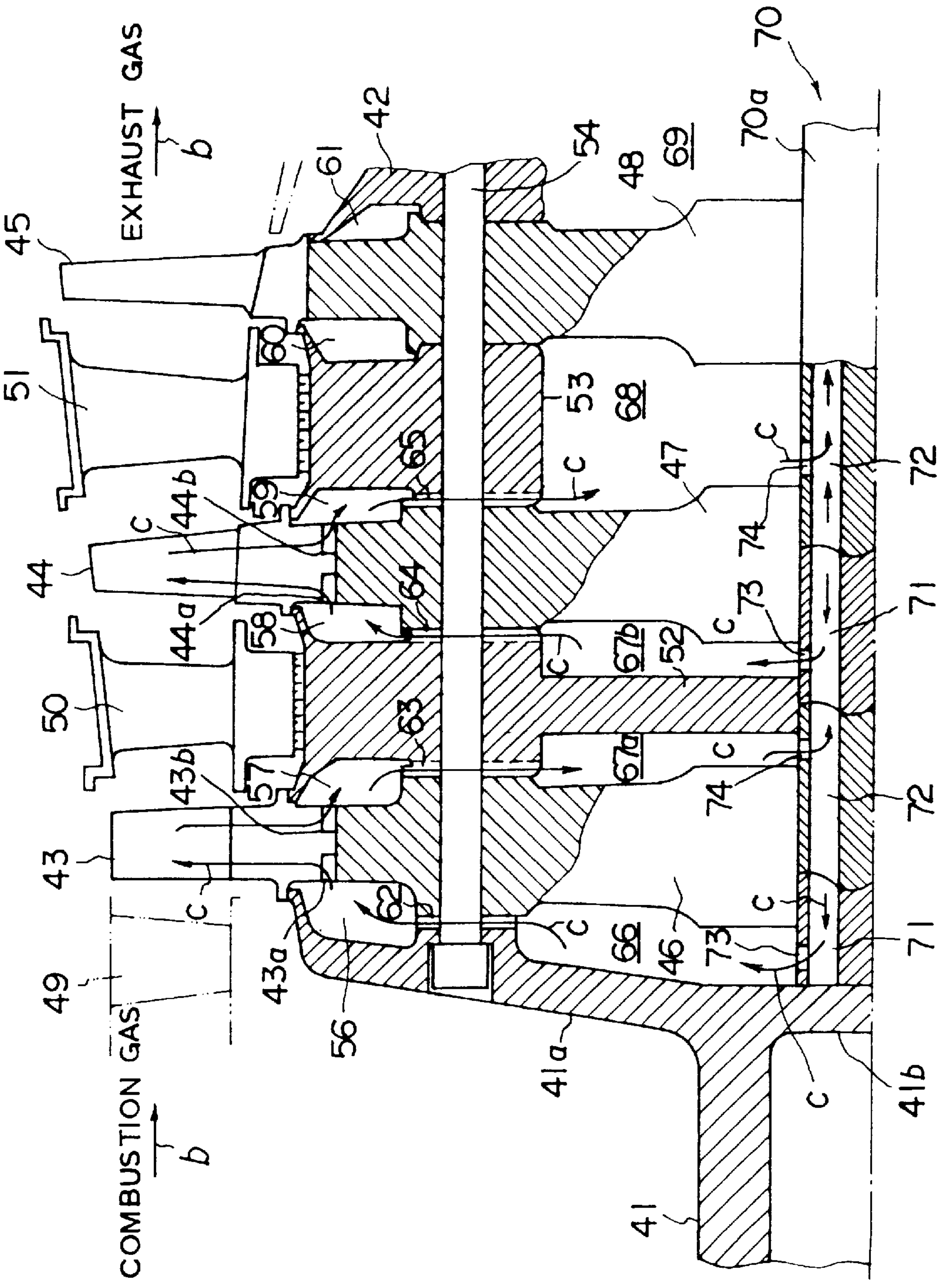
FIG. 9 is a sectional view illustrating a third embodiment of the gas turbine cooling apparatus in accordance with the present invention.

FIG. 9 is a sectional view illustrative of a third embodiment of a cooling apparatus for a gas turbine moving blade. This embodiment is different from the first embodiment in that the spacer for constituting the turbine rotor is extended to the central axis portion of the rotor until it comes in contact with the passage assembly and that the space between a pair of discs for constituting the turbine rotor which hold the spacer therebetween is divided into two in the axial direction.

Specifically, in this embodiment, as shown in FIG. 9, a spacer 52 positioned between the first-stage disc 46 and the second-stage disc 47 is extended to the outer periphery of the passage assembly thereby to divide the space 67 between the first-stage disc 46 and the second-stage disc 47 into two spaces 67*a* and 67*b*. The cooling medium supplying ports 73 are opened to the space 66 on the upstream side of the first-stage disc 46 and the space 67*b* between the spacer 52 and the second-stage disc 47, respectively. Further, the cooling medium recovering ports 73 are opened to the space 67*a* between the first-stage disc 46 and the spacer 52 and also opened to the space 68 on the downstream side of the second-stage disc 47. This causes the cooling medium c at the first-stage moving blade 43 and the second-stage moving blade 44 to flow in the direction along which the combustion gas b flows. In other words, the cooling medium flows in the same direction as in the first embodiment at the first-stage moving blade 43, whereas it flows in the opposite direction from that in the first embodiment at the second-stage moving blade 44. Since the rest of the structure is approximately identical to that of the first embodiment, like reference numerals in FIG. 1 are assigned to corresponding components in FIG. 9, and the description thereof will be omitted herein.

The configuration of the third embodiment provides an advantage of further improved cooling performance because the cooling medium is supplied from the side of the front edges, where the temperature is higher, of the first- and second-stage moving blades 43 and 44, in addition to those advantages presented by the first embodiment. The circulating direction of the cooling medium may be reversed from that in this embodiment as necessary.

Fourth Embodiment

Figure 10:
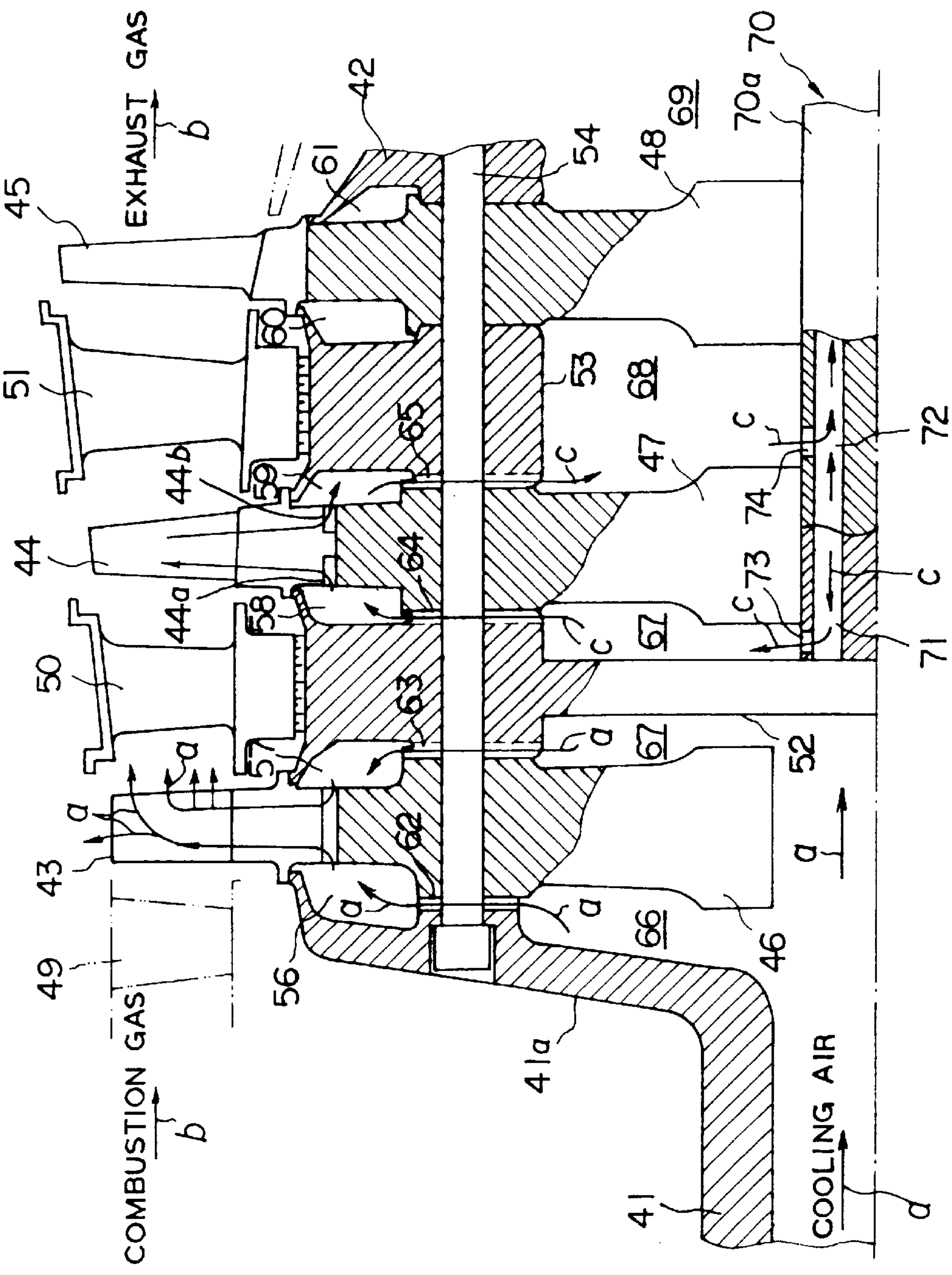
FIG. 10 is a sectional view illustrating a fourth embodiment of the gas turbine cooling apparatus in accordance with the present invention.

FIG. 10 is a sectional view illustrative of a fourth embodiment of a cooling apparatus for a gas turbine. This embodiment is different from the first embodiment in that it provides a combined functions of the closed-loop cooling and the open-loop cooling.

Specifically, the spacer 52 is located on the downstream side of the disc 46 for constituting a turbine rotor, in which the moving blade 43 of the first stage which is the high-temperature and high-pressure stage is implanted. The spacer 52 is shaped into a disc extending to the central axis portion of the turbine rotor 55 so as to separate the spaces 56 and 57, 66 and a part of the space 67 in the turbine rotor 55, in which the first-stage moving blade 43 is disposed, from other stages by the spacer 52. In this arrangement, the discharge air a from the compressor is supplied as the cooling medium to the first-stage moving blade 43 to perform the open-loop cooling and another cooling medium c such as steam is supplied to the second-stage moving blade 44 through the passage assembly 70 to perform the closed-loop cooling. Since the rest of the structure is approximately identical to the structure of the first embodiment, like reference numerals in FIG. 1 are assigned to corresponding components in FIG. 10, and the description thereof will be omitted herein.

The structure of the fourth embodiment provides an advantage in that the hot portions can be effectively cooled by the open-loop cooling in addition to the similar advantages to those presented by the first embodiment. More specifically, since the first-stage moving blade 43 is exposed to a particularly severe thermal condition, it may need membrane cooling because of difficulty in applying only the internal convective cooling. Therefore, applying the closed-loop cooling system only to the low-pressure stage of the turbine provides sufficiently higher heat efficiency, so that improved efficiency over that in a conventional air gas turbine is expected. For this reason, in this embodiment, the convective cooling which makes it possible to use the discharge air of the compressor, and the membrane cooling are applied to the first-stage moving blade 43. The spacer 52 separates the passages to permit the closed-loop cooling for the lower-pressure stages. In FIG. 10, the closed-loop cooling system is applied only to the second-stage moving blade 44. However, the closed-loop cooling may also be used for the third-stage moving blade 45 (or moving blades of the stages following the third stage if there are more than three stages).

Fifth Embodiment

Figure 11:
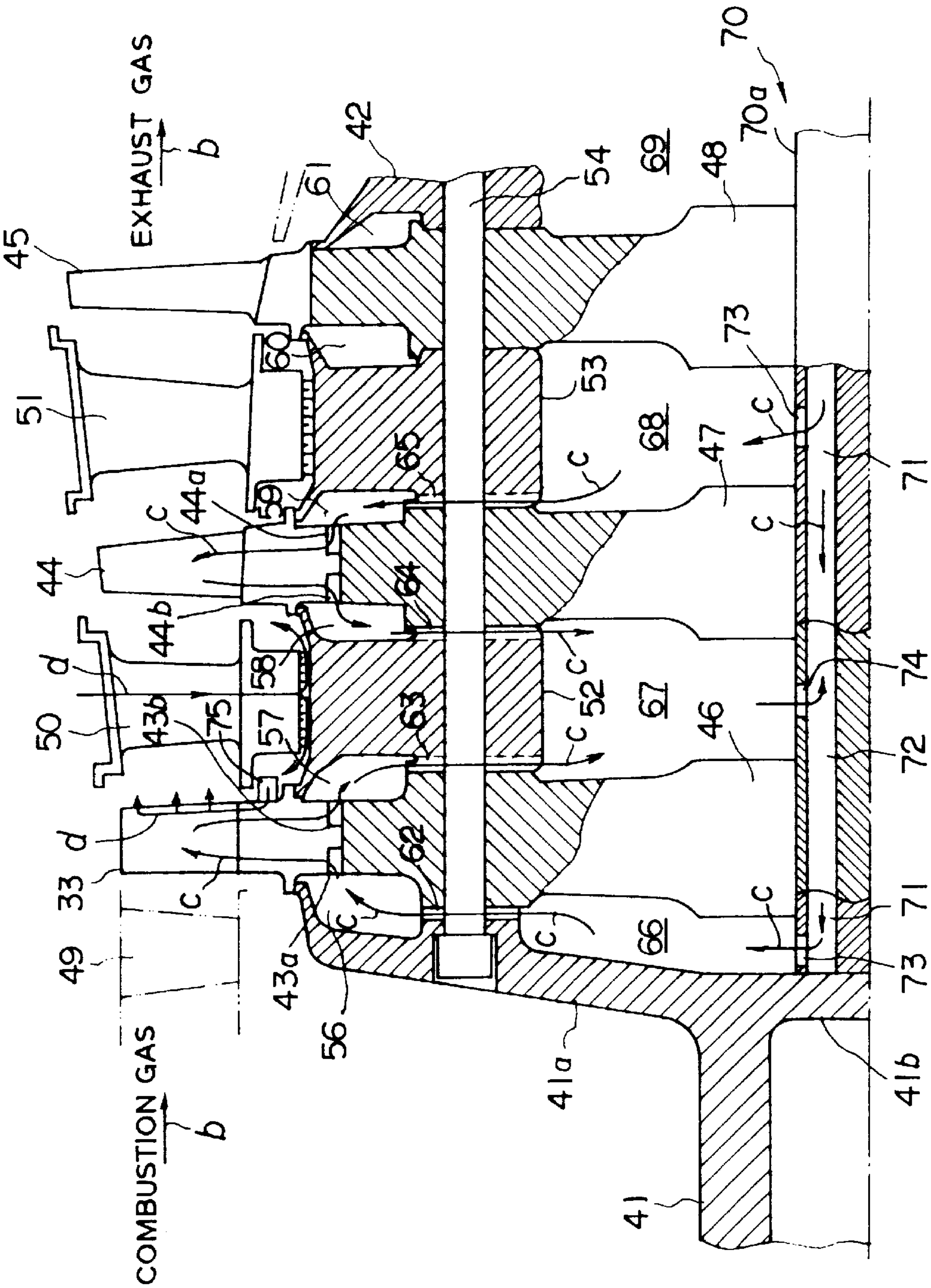
FIG. 11 is a sectional view illustrating a fifth embodiment of the gas turbine cooling apparatus in accordance with the present invention.

FIG. 11 is a sectional view illustrative of a fifth embodiment of the cooling apparatus for a gas turbine. This embodiment is different from the first embodiment in that it employs a "hybrid cooling structure" wherein sealing air d of the stationary blade 50 is used for the trailing edge of the first-stage moving blade 43 in addition to the closed-loop cooling which includes the passage assembly 70.

Specifically, as described above, it is particularly difficult to apply the internal convective cooling to the trailing edge portion of the first-stage moving blade 43 which is exposed to the severe thermal condition, providing also a problem in the uniformity in cooling. To solve such problem, this embodiment employs the closed-loop cooling for the first-stage moving blade 43. In addition, a part of the sealing air d supplied through the stationary blade 50 is captured and applied to the trailing edge of the first-stage moving blade 43 by a sealing air recovering and cooling section 75 installed at the rear of the portion, where the first-stage moving blade 43 is implanted, and it is jetted from the trailing edge of the blade so as to prevent hot gas from flowing into the area between the rotating member and the stationary member.

According to the structure of the fifth embodiment, the respective moving blades 43 and 44 can mostly be cooled by the closed-loop cooling system and the cooling medium which has been used for the closed-loop cooling is recovered. In addition, the trailing edge of the first-stage moving blade 43 which is most difficult to be cooled is effectively and uniformly cooled by adopting the open-loop cooling. This structure solves the problem of the difficulty in cooling the trailing edge of the first-stage moving blade 43, which is exposed to the severe thermal condition, by the internal convective cooling.

The present invention also provides a gas turbine equipped with the moving blade cooling apparatus having the improved structures mentioned above.

A gas turbine system used for a power plant is generally arranged as shown in FIG. 12, which comprises a compressor 102 for compressing air, a combustor 103 operatively connected to the combustor 103 and a turbine body 101 generally comprising a turbine rotor of the type mentioned with reference to the forgoing embodiment. According to such arrangement, the air is compressed by driving a compressor 102 coaxially provided with a gas turbine body 101 and is supplied to the combustor 103. The fuel is burnt in the liner portion 103*a* of the combustor 103, and a high temperature combustion gas resulting from the combustion is guided to moving blades 106 disposed in the turbine rotor through a transition piece 104 and stationary blades 105 of the gas turbine body 101, so that the gas turbine delivers work by the rotation of the moving blades 106. It will apparent that the blades 105 and 106 correspond to blades 49 and 43 in the first embodiment of FIG. 1, for example. That is, the gas turbine of the present invention is generally equipped with the cooling apparatus for the moving blade disposed in the turbine rotor, and accordingly, all the embodiments shown to FIGS. 1–11 may be applicable to the gas turbine of the type shown in FIG. 12.

What is claimed is:

1. A cooling apparatus for a moving blade of a gas turbine, which comprises:

a rotor having a plurality of discs which are mounted with an interval between adjacent disc;

a plurality of moving blades respectively mounted to an outer peripheral portion of each of the discs and a plurality of spacers respectively disposed in spaces between the respective discs at portions in proximity with said stationary blades wherein the moving blades are each formed with a cooling medium flow passage having inlet and outlet portions in communication with an interior of the rotor and wherein the discs and the spacers are arranged with spaces therebetween for passage of a cooling medium in a radial direction of the rotor so as to form a closed-loop cooling unit for supplying the cooling medium to the cooling medium passage formed in the moving blade and recovering the same therefrom, a passage assembly having a cooling medium supply passage and a cooling medium recovery passage running in parallel to each other in an axial direction of the turbine rotor, said passage assembly being provided at a central axis portion of the turbine rotor, said cooling medium supply passage including a cooling medium supply port in communication with a cooling medium inlet of the cooling medium flow passage formed in the moving blade through said space, said cooling medium recovery passage of the passage assembly including a cooling medium recovery port in communication with a cooling medium outlet of the cooling medium flow passage in the moving blade through said space, wherein at least one of the discs and the spacers of the turbine rotor extends to a central axis portion of the turbine rotor so as to form a portion of the passage assembly by using the extended portion and wherein the passage assembly is connected to said extended portion; and a spacer located on the downstream side of the disc forming the turbine rotor, said spacer including an implanted moving blade of a high-temperature and a high-pressure stage which includes a disc shape which extends to the central access portion of the turbine rotor wherein a space in the turbine rotor, in which the moving blade, of the high-temperature and high-pressure stage is disposed, is separated from other stages by said spacer so as to supply the air discharged from a compressor to the moving blade of the high temperature and high-pressure stage as a first cooling medium to perform open-loop cooling, and wherein the second medium is supplied to the moving blades of the other stages via the passage assembly so as to perform closed-loop cooling.

2. A cooling apparatus for a moving blade of a gas turbine, which comprises:

a rotor having a plurality of discs which are mounted with an interval between adjacent discs;

a plurality of moving blades respectively mounted to an outer peripheral portion of each of the discs and a plurality of spacers respectively disposed in spaces between the respective discs at portions in proximity with said stationary blades wherein the moving blades are each formed with a cooling medium flow passage having inlet and outlet portions in communication with an interior of the rotor and wherein the discs and the spacers are arranged with spaces therebetween for passage of a cooling medium in a radial direction of the rotor so as to form a closed-loop cooling unit for supplying the cooling medium to the cooling medium flow passage formed in the moving blade and recovering the same therefrom, a passage assembly having a cooling medium supply passage and a cooling medium recovery passage running in parallel to each other in an axial direction of the turbine rotor, said passage assembly being provided at a central axis portion of the turbine rotor, said cooling medium supplying passage of the passage assembly including a cooling medium supply port in communication with a cooling medium inlet of the cooling medium flow passage formed in the moving blade through said space, said cooling medium recovery passage of the passage assembly including a cooling medium recovery port in communication with a cooling medium outlet of the cooling medium flow passage in the moving blade through said space, wherein at least one of the discs and the spacers of the turbine rotor extends to a central axis portion of the turbine rotor so as to form a portion of the passage assembly by using the extended portion and wherein the passage assembly is connected to said extended portion;

wherein at least one of the discs or the spacers forming the turbine rotor is extended to central axis portion of the turbine rotor to form a part of the passage assembly by using the extended portion and the passage assembly is connected to said extended part;

wherein the spacer extends toward the central axis portion of the turbine rotor and a space located between a pair of discs of the turbine rotor which holds the spacer therebetween is divided into first and second sections such that the cooling medium flows in a first direction in the first section and in an opposite direction in the second section.

3. A cooling apparatus for moving blade of a gas turbine having a rotor in which a plurality of discs are mounted with an interval between adjacent discs, a plurality of moving blades are mounted each to an outer peripheral portion of each of the discs and a plurality of spacers are disposed in spaces between the respective discs and in which the moving blades are formed each with a cooling medium flowing passage having inlet and outlet portions communicating with an interior of the rotor and the discs and the spacers are arranged with spacers therebetween for passing a cooling medium in a radial direction of the rotor, so as to form a closed-loop cooling unit for supplying the cooling medium to the cooling medium flowing passage formed in the moving blade and recovering the same therefrom, wherein sealing air is supplied from inner peripheral ends of the stationary blades toward the outer peripheral surfaces of said discs, a passage assembly which has cooling medium supply passages and cooling medium recovery passages running in parallel in an axial direction is provided at the central axis portion of the turbine rotor, cooling medium supply ports in communication with the side of cooling medium inlets of the cooling medium flow passage of the moving blades through the spaces are formed in the cooling medium supply passages of the passage assembly, cooling medium recovery ports in communication with the side of the cooling medium outlets of the cooling medium flowing passages of the moving blades through the spaces are formed in the cooling medium recovery passages of the passage assembly and wherein a sealing air recovery and cooling section which recovers a part of the sealing air from the inner peripheral ends of initial stage blades for providing cooling air to passages formed in a trailing edge of a moving blade is positioned on the upstream side of said stationary blades supplying said sealing air.

4. A gas turbine comprising:

a compressor for compressing an air;

a combustor operatively connected with the compressor to be supplied with the compressed air for carrying out a combustion with a fuel; and a gas turbine body including a turbine rotor which is driven by a combustion gas from the combustor and in which a plurality of discs are mounted with an interval between adjacent discs, a plurality of moving blades are mounted each to an outer peripheral portion of each of the discs and a plurality of spacers are disposed in the spaces between the respective discs and in which the moving blades are each formed with a cooling medium flow passage having inlet and outlet portions communicating with an interior of the rotor and the discs and the spacers are arranged with spaces therebetween for passing a cooling medium in a radial direction of the rotor, so as to form a closed-loop cooling unit for supplying the cooling medium to the cooling medium flow passage formed in the moving blade and recovering the cooling medium therefrom, wherein sealing air is supplied from inner peripheral ends of the stationary blades toward the outer peripheral surfaces of said discs, a passage assembly which has cooling medium supply passages and cooling medium recovery passages running in parallel in an axial direction is provided at the central axis portion of the turbine rotor, cooling medium supply ports in communication with the side of cooling medium inlets of the cooling medium flowing passage of the moving blades through the spaces are formed in the cooling medium supplying passages of the passage assembly, cooling medium recovering ports in communication with the side of the cooling medium outlets of the cooling medium flow passages of the moving blades through the spaces are formed in the cooling medium recovery passages of the passage assembly and a sealing air recovery and cooling section which recovers a part of the sealing air from the inner peripheral ends of initial stage blades for providing cooling air to passages formed in a trailing edge of a moving blade is positioned on the upstream side of said stationary blades supplying said sealing air.

* * * * *